Dec. 8, 1959     L. H. FLORA     2,916,114
FASTENING DEVICES
Original Filed Aug. 18, 1952
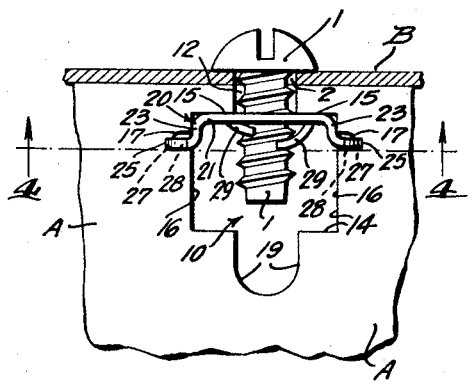
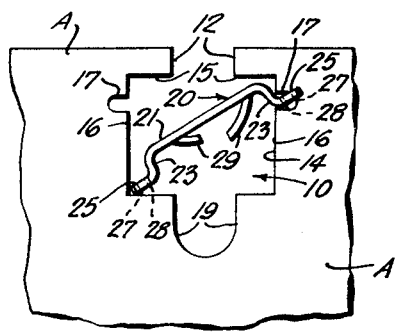
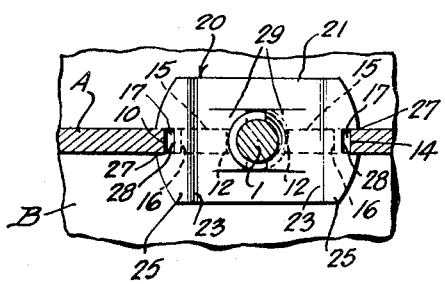
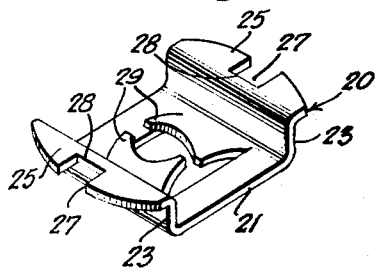
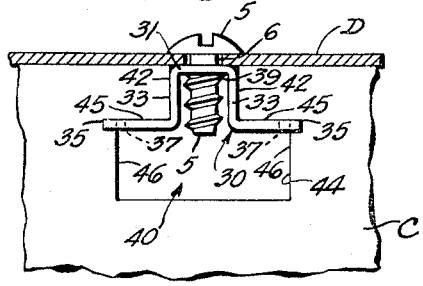
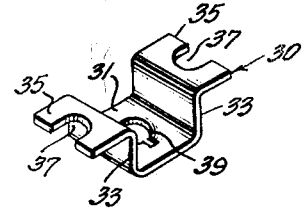
INVENTOR
LAURENCE H. FLORA
BY
ATTORNEY

United States Patent Office 2,916,114
Patented Dec. 8, 1959

2,916,114
FASTENING DEVICES

Laurence H. Flora, Cleveland, Ohio, assignor to Tinnerman Products, Inc., Cleveland, Ohio, a corporation of Ohio Original application August 18, 1952, Serial No. 304,971, now Patent No. 2,737,269, dated March 6, 1956. Divided and this application January 13, 1956, Serial No. 558,967

2 Claims. (Cl. 189—88)

This invention relates in general to the fabrication of structures wherein the adjoining surface portions of panels, plates, or similar parts are positioned substantially at right angles to each other as secured in a completed assembly. The invention deals, more particularly, with an improved fastener and fastening arrangement for such an assembly in which the edge portion of a plate or panel is secured at right angles directly to the adjacent surface of an associated plate, panel or other part in a strong, durable and reliable connection provided by a simple, inexpensive spring nut or nut device and a cooperating bolt or screw. This application is a division of application Serial Number 304,971 filed August 18, 1952, and now Patent No. 2,737,269.

A primary object of the invention is to provide an improved fastener and fastening arrangement for an assembly of this character, wherein the edge portion of the plate or panel to be secured is provided with a cutout in the plane thereof in which a nut is attached in position for threadedly engaging a cooperating bolt or screw in a manner whereby the edge portion of said plate or panel is firmly and rigidly secured at right angles to the surface of the other part in a direct connection which is complete in itself, and requires no special adapters or supporting means such as angle brackets, corner pieces, or the like. The invention, accordingly, provides for considerable savings and important advantages in such assemblies in eliminating the cost of such angle brackets or corner pieces together with the cost of the retaining means therefor and the labor involved in the assembly and attachment thereof.

A further object of the invention is to provide an improved fastening arrangement for an assembly, as and for the purposes aforesaid, in which the edge portion of a plate, panel or similar part to be secured is provided with a cutout in a special formation for attaching a nut in said cutout with the thread engaging means of said nut in position for threadedly engaging a cooperating bolt or screw extending into said cutout in the plane of said plate or panel.

Another object of the invention is to provide a fastening arrangement of the kind described in which the nut attached in the cutout in the plate or panel to be secured is provided in the form of a simple one-piece fastener having integral attaching means by which the nut is easily and quickly applied to attached position in the cutout and is locked in such attached position against accidental removal or displacement.

A more specific object of the invention is to provide such a fastener and fastening arrangement in which the nut attached in the cutout in the plate or panel to be secured is provided as a relatively cheap and inexpensive sheet metal spring nut provided with an integral thread portion for threadedly engaging a bolt or screw together with integral attaching means in the form of oppositely extending flanges having slots or notches which fit over and engage opposing marginal edges of said cutout in the part to be secured in a manner whereby the nut is locked in attached relation in the cutout against accidental removal or displacement from its proper fastening position.

Further objects and advantages, and other new and useful features in the construction, arrangement and general combination of patrs of the invention will be readily apparent as the following description proceeds with reference to the accompanying drawings, for purposes of illustration but not of limitation, in which like reference characters designate like parts throughout, and in which:

Fig. 1 illustrates an assembly of parts secured by a fastener in accordance with the invention and shows in elevation a plate or panel prepared with a cutout retaining a nut which is engaged with a bolt or screw securing said plate or panel to a cooperating plate or other part shown in section;

Fig. 2 is an elevational view of the plate or panel having a cutout for retaining a nut in attached position on said plate and shows the nut as initially positioned in angular relation in said cutout in the assembly thereof to final attached position in said cutout as illustrated in Fig. 1;

Fig. 3 illustrates the nut per se shown in Figs. 1 and 2 as seen in an inverted perspective view; and, Fig. 4 is a sectional view of Fig. 1 along line 4—4 looking in the direction of the arrows.

Fig. 5 is a view similar to Fig. 1 showing another type of assembly in which it is necessary or desirable to use a nut of relatively small size; and, Fig. 6 illustrates the nut shown in Fig. 5 as seen in an inverted perspective view.

The invention is one of general utility in that the fastening arrangement and general form of the fasteners employed are readily adapted for a wide range and variety of applications and uses as the means for securing an assembly in which the edge portion of a plate or panel is connected directly to the surface of an associated plate, panel or other part as, for example, in a partition construction, or other structure wherein the edge portion of a plate or panel is positioned in normal relation or substantially at right angles to the part to which it is secured.

Referring now, more particularly, to the drawings, Figs. 1–4, inclusive, disclose one embodiment of the invention wherein a part A comprising a metal plate or panel, or the like, is secured with its edge portion in normal relation to the part B in the form of a cooperating plate, panel or other structural member. To this end, the plate A is provided with a generally T-shaped cutout or recess 10 in the plane thereof for retaining a nut 20, with the axis of the thread opening in said nut 20 lying in the plane of said part A and substantially in line therewith and extending in the same general direction as said part A. The arrangement, accordingly, is such that the bolt or screw 1, Figs. 1 and 4, is adapted to extend into the cutout 10 in the plane of plate A in position for threading with the nut 20 in a manner to secure said plate A directly to and in normal relation to the adjacent surface of the plate B or other part.

The invention is particularly advantageous by reason of the arrangement in which the nut 20 is attached directly in the cutout 10 in part A without need for riveting, welding or other extraneous attaching means and without the use of a special bracket, cage or the like, such that the entire fastening arrangement is provided at a minimum cost involving only the cost of the nut 20 and the provision of the cutout 10 in the plate A. The fastening arrangement otherwise is such that the nut is positively retained in attached position in the cutout 10 in part A against accidental displacement or removal and may be adapted for slight shifting, if necessary or desirable, to compensate for possible manufacturing variations or misalignment of the bolt or screw passages in the parts to be secured.

The cutout 10 in part A is provided substantially as shown in Figs. 1 and 2 to serve both as a recess for retaining the nut 20 and as a passage for the cooperating bolt or screw 1. The cutout 10, accordingly, comprises a passage 12 at the edge of the plate or panel A slightly wider than the crest diameter of the bolt or screw 1 so that said bolt or screw is snugly received between the opposite edges of said passage 12 in applied position as seen in Fig. 1. The bolt or screw passage 12 leads to and is in communication with an enlarged nut retaining recess 14 having a generally rectangular outline comprising upper straight edge portions 15 defining abutments adjacent to and on opposite sides of the passage 12. The vertical side edges 16 of said recess 14 are provided with opposing slots 17 having a predetermined spacing from said abutments 15 while the lower edge of said recess 14 preferably is formed with a passage 19 to provide suitable clearance in this area for the end of a longer bolt or screw which may be preferable or required in certain assemblies.

The spring nut 20 is advantageously provided as a simple, low cost, one-piece sheet metal stamping in the form of an inverted generally U-shaped clip comprising a base or body portion 21 intermediate the end portions which are bent in normal relation to said base to provide a pair of attaching arms 23 having a spacing corresponding substantially to the width of the recess 14 in said cutout 10. The extremities of said arms 23 are bent outwardly to define a pair of oppositely extending flanges 25 which are partialy cut to define notches 27 and shoulders 28 inwardly thereof with said notches being of such size as to receive the thickness of the part A beyond the ends of said slots 17. The construction, otherwise, is such that the arm portions 23 and outwardly extending flanges 25 having the notches 27 are so provided as to permit assembly of the nut in said recess 14, as seen in Fig. 1, with said base 21 seated on the horizontal straight edge portions 15 of the recess 14 and the arm portions 23 positioned adjacent the vertical side edges of said recess 14 and the notches 27 on said end flanges 25 fitting in interconnected relation in the opposite slots 17 in said recess 14 to lock the nut in attached position in said recess.

To this end, the notches 27 in the flanges 25 of the nut are provided in a predetermined size and spacing such that the distance across the nut between the shoulders 28 at the inner ends of said notches 27 is greater than the distance between the vertical side edges 16 of the recess 14 but less than the enlarged spacing provided by the slots 17 in said recess 14. The arrangement, accordingly, is such that the nut 20 must be tilted at an angle on being initially applied to attached position in the recess 14, as illustrated in Fig. 2, and the body of the nut flexed as necessary to spring the shoulders 28 on the flanges 25 of the nut into the slots 17 of the recess 14 as shown in Fig. 1 with the adjacent side edges of said notches 17 straddling the opposite surfaces of part A beyond the ends of said slots 17 as shown in Fig. 4. In such attached position of the nut 20, the nut is locked in the recess 14 against movement both lengthwise and sidewise of the nut as well as upwardly or downwardly in said recess 14. Thus, the nut is retained against lengthwise movement in attached position in the recess 14 by the arm portions 23 of the nut in abutting relation with the adjacent vertical side edges 16 of said recess 14 as seen in Fig. 1, and sidewise movement or transverse tilting of the nut is prevented by the side edges of the open ends of the notches 27 which straddle the opposite surfaces of part A beyond the inner ends of the slots 17, as illustrated in Fig. 4; the nut is otherwise retained against movement upwardly or downwardly in said recess 14 by the shoulders 28 on the flanges 25 of the nut which project into the open ends of said slots 17 in said recess 14. Preferably the corners of said flanges 25 of the nut are rounded off, as seen in Fig. 3, to avoid the danger of sharp edges in a completed assembly.

The intermediate base or body portion 21 of the nut carries a suitable nut or equivalent thread engaging means such as tongues or thread engaging elements 29 integrally formed from the material of said base or body 21 of the fastener in a one-piece sheet metal fastener substantially as shown in Fig. 3. Such thread engaging elements 29 are best provided from the sheet metal material of the base or body portion 21 of the fastener by an aperture intermediate spaced parallel slits which form cooperating tongues, or the like, having spaced extremities defining the desired thread or thread opening corresponding substantially to the root diameter of the bolt or screw 1 for threadedly engaging the thread thereof. Said tongues 29 otherwise are preferably formed to project out of the plane of the base or body 21 and are bent lengthwise in substantial ogee formation to provide for the maximum strength obtainable to withstand the tightening action of the bolt or screw 1 as it is advanced to final applied fastening position.

Such thread engaging means may be pressed, stamped, extruded, or otherwise provided on the fastener in any suitable form or construction so long as the same threadedly engage with the thread of the bolt or screw 1 and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the wall thereof tapped for threadedly engaging the bolt or screw. However, thread engaging means prepared in the form of cooperating, yieldable tongues 29, as shown, are possessed of unusual inherent strength and will not collapse or pull through when the bolt or screw 1 is tightened, nor loosen under continuous strain and vibration in the installation. This takes place by reason of the fact that the sheet metal material from which tongues are formed is of less thickness than the pitch or spacing between adjacent thread convolutions of the bolt or screw, wherefore the extremities of said tongues 29 tend, more effectively, to move toward each other and dig into the grooves intermediate adjacent thread convolutions of the bolt or screw 1 when tightened, and otherwise become embedded in the root of the bolt in locked, frictional fastening engagement therewith, thereby providing an automatic thread lock on the screw or bolt 1 in any tightened positioned thereof which prevents accidental loosening thereof under the most severe conditions of vibration, or the like. Thus, in the present example, the tongues are shown as extending out of the plane of the body or base 21 in substantial ogee formation and provided preferably with arcuately notched extremities, forming substantial biting jaws adapted to cut into the root of the bolt and the adjacent thread surfaces thereon in positive locking relation therewith in the most effective manner. There is thereby eliminated the necessity for a separate, auxiliary locking means such as a lock nut or lock washer which, of course, provides for considerable savings in eliminating the cost of such locking devices and the expense involved in the tedious, time consuming assembling operations and other added steps in manufacture which these auxiliary locking means require. It is to be understood, however, that the present invention is not limited in any manner or form to the illustrated construction of the thread engaging means 29 but rather, fully contemplates any similar and related form of nut or equivalent thread engaging means.

The completed nut 20 appears substantially as shown in Fig. 3, and in attaching the same to part A, said nut is initially positioned in the recess 14, as shown in Fig. 2, with the notch 27 on one flange 25 fitted into the adjacent slot 17 in said recess 14. The body of the nut 20 is tilted at an angle as necessary to permit the other flange 25 to enter into said recess 14 and to be manipulated so that the notch 27 therein straddles the adjacent vertical edge 16 of the recess 14. This end of the nut is thereupon pushed to seat the associated shoulder 28 in its cooperating slot 17 as shown in Fig. 1, in a procedure wherein the body of the nut is flexed as necessary to permit said shoulder 28 to ride on the adjacent vertical side edge 16 of said recess 14 until it snaps into said cooperating slot 17.

Each of the shoulders 28 on the flanges 25 of the nut is thus seated in its cooperating slot 17 in the recess 14 in the fully attached position of the nut in said recess 14, with the base 21 of the nut seated against the horizontal edge portions 15 of the recess and the arms 23 abutting the adjacent vertical side edges 16 of said recess in a manner whereby the nut is locked in attached position in said recess 14 against movement both lengthwise and sidewise of the nut as well as upwardly or downwardly in said recess 14, as aforesaid. This construction and arrangement is usually provided where it is desired that the nut be more or less fixedly retained in attached position in the recess 14. However, suitable provision may be made for limited movement of the nut in such attached position by providing the arms 23 with a slight clearance from the adjacent side edges 16 of the recess 14 and forming the notches 27 in the flanges 25 slightly larger than required such that the nut is locked in attached position, as aforesaid, but is capable of slight shifting as may be necessary or desirable for aligning the nut 20 and bolt or screw 1 in the final securing action, or for other possible adjustment purposes.

With the nut 20 thus attached in the recess 14, the tongues 29 or equivalent thread engaging means are in suitable alignment with the passage 12 to receive the bolt or screw 1 for securing a cooperating part directly to the edge of the plate A. In the present example, the part B is shown as a plate or panel having an opening 2 through which the bolt or screw extends into the passage 12 of the cutout 10 and into threaded engagement with the tongues 29 of the nut in a manner whereby the edge portion of plate A is secured firmly and rigidly in normal relation to the adjacent surface of part B.

Figs. 5 and 6 show another form of fastener and fastening arrangement which is generally similar in application and use to that described with reference to Figs. 1–4, inclusive. The nut 30 is provided in the same general construction in the manner of an inverted generally U-shaped clip comprising a central base or body portion 31 intermediate a pair of spaced arms 33 having outwardly extending flanges 35 provided with notches 37. This nut 30 is advantageously provided in relatively small sizes for small compact assemblies and to this end, the central base or body 31 is provided in a relatively small size slightly larger than the shank of the bolt or screw 5 to be employed, while said spaced arms 33 are somewhat longer and are bent in generally normal relation to said base 31 in a spacing slightly wider than necessary for the bolt or screw 5 to pass therebetween. In such a nut having a relatively small base 31, it is preferable to provide the thread engaging means 39, Fig. 6, in a corresponding small size in the form of a keyhole type of thread opening having a radial kerf or slit for passing the thread of the bolt or screw 5 with the marginal portion of said opening defining a helical thread for threadedly engaging the thread on said bolt or screw 5.

The plate or panel C is provided with a similar T-shaped cutout 40 having a passage 42 leading to an enlarged recess 44 having horizontal upper straight edges 45 and vertical side edges 46. The recess 44 is provided, similarly, in such a size that the nut must be held at an angle in order to pass the ends of the flanges 35 on the nut into said recess 44, whereupon the nut is readily manipulated to attached position in the cutout 40 as shown in Fig. 5. In such attached position of the nut, the notches 37 on the flanges straddle the adjacent vertical edge portions 46 of the recess 44 with the arm portions 33 extending into the passage 42 and the flanges 35 bearing on the horizontal straight edge portions 45 of said recess 44 such that the nut is locked in attached position in said cutout 40 against movement both lengthwise and sidewise of the nut. Thus, the nut is retained against lengthwise movement by the arms 33 abutting the side edges of the passage 42, while sidewise or tilting movement thereof is prevented by the notches 37 which straddle the opposite surfaces of the part C adjacent the vertical side edges 46 of said recess 44. In the attached fastening position of the nut 30, the flanges 35 bear upon the horizontal edge portions 45 of the recess 44 to limit the movement of the nut as necessary for the central base 31 to lie slightly below or substantially flush with the edge of part C as shown in Fig. 5. The bolt or screw 5 extending through an opening 6 in the plate D or other part, is then readily applied to threaded engagement with the thread engaging means 39 provided in said base 31 of the nut in a manner whereby the edge portion of plate C is secured firmly and rigidly in normal relation to the adjacent surface of said plate D.

The nut in any form preferably is constructed of relatively thin sheet metal the thickness of which is selected according to service requirements and the predetermined size of the parts to be secured. The nut is most effective when provided of spring metal suitably spring tempered and otherwise treated to give the desired toughness and hardness, particularly in the case of devices for use in heavy duty applications. A cheap and highly effective nut may be provided from cold rolled metal such as cold rolled steel which is untempered but of a spring metal nature and capable of providing an effective and reliable securing device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A fastening assembly comprising a plate having an edge portion provided with a cutout, said cutout comprising a passage at the edge of said plate for a threaded stud to be applied in said passage with its axis in the plane of said plate and a recess communicating with said passage, said recess being larger than said passage and being provided in said plate in spaced relation to said edge of said plate, the edges of said recess comprising spaced abutments adjacent to and on opposite sides of said passage and spaced side edges at the ends of said recess, a fastener comprising a sheet metal body defining a base provided with means for threadedly engaging said threaded stud, spaced arms extending from the ends of said base in the same general direction and toward said recess, flanges extending outwardly from the ends of said arms, said base lying in said passage in generally normal relation to the plane of said plate and being substantially flush with the outer end of said passage, said means for threadedly engaging said stud being in line with said passage, said spaced arms being in abutting relation to the sides of said passage with said flanges bearing on said spaced abutments of said recess, and said flanges having notches in the outer ends thereof receiving marginal portions of said side edges of said recess to prevent sidewise movement of said fastener with respect to said plate.

2. A fastening assembly comprising a plate having an edge portion provided with a cutout, said cutout comprising a passage at the edge of said plate for a threaded stud to be applied in said passage with its axis in the plane of said plate and a recess communicating with said passage, said recess being larger than said passage and being provided in said plate in spaced relation to said edge of said plate, the edges of said recess comprising spaced abutments adjacent to and on opposite sides of said passage and spaced side edges at the ends of said recess, a fastener comprising a sheet metal body defining a base provided with means for threadedly engaging said threaded stud, spaced arms extending from the ends of said base in the same general direction and toward said recess, and flanges extending outwardly from the free ends of said arms, said flanges comprising notches in the outer ends thereof receiving marginal portions of said side edges of said recess, said base lying in said passage in generally normal relation to the plane of said plate and being substantially flush with the outer end of said passage, said means for threadedly engaging said stud being substantially in line with said passage, said spaced arms being in abutting relation to the sides of said passage and in generally contiguous relation to said stud, and said flanges bearing on said spaced abutments of said recess, the distance between the inner ends of said notches being less than the distance between said spaced side edges of said recess whereby said arms engage in full surface-to-surface relationship with the sides of said passage to prevent lengthwise movement of said fastener in said cutout and with respect to said plate.

References Cited in the file of this patent

UNITED STATES PATENTS

| | | |
|---|---|---|
| 2,394,491 | Schaper | Feb. 5, 1946 |
| 2,399,957 | Tinnerman | May 7, 1946 |
| 2,524,176 | Reiner | Oct. 3, 1950 |
| 2,552,782 | Hall et al. | May 15, 1951 |
| 2,737,269 | Flora | Mar. 6, 1956 |

FOREIGN PATENTS

| | | |
|---|---|---|
| 895,749 | France | Apr. 11, 1944 |